United States Patent
Kubota et al.

(10) Patent No.: US 12,054,636 B2
(45) Date of Patent: Aug. 6, 2024

(54) COATING PROCESS AND METHOD FOR PRODUCING ELECTRONIC COMPONENT

(71) Applicant: Murata Manufacturing Co., Ltd., Kyoto-fu (JP)

(72) Inventors: Hironobu Kubota, Nagaokakyo (JP); Tomoya Ooshima, Nagaokakyo (JP); Yuuta Hoshino, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 120 days.

(21) Appl. No.: 17/173,046

(22) Filed: Feb. 10, 2021

(65) Prior Publication Data
US 2021/0253899 A1    Aug. 19, 2021

(30) Foreign Application Priority Data
Feb. 13, 2020 (JP) ................. 2020-022340

(51) Int. Cl.
*C09D 183/04* (2006.01)

(52) U.S. Cl.
CPC .................. *C09D 183/04* (2013.01)

(58) Field of Classification Search
CPC .................................. C09D 183/04
See application file for complete search history.

(56) References Cited

U.S. PATENT DOCUMENTS

| | | | |
|---|---|---|---|
| 5,064,690 A * | 11/1991 | Sando | C04B 35/62805 427/215 |
| 2004/0071863 A1 | 4/2004 | Zhu et al. | |
| 2006/0121258 A1* | 6/2006 | Kim | C04B 35/468 428/210 |
| 2016/0217920 A1 | 7/2016 | Choi et al. | |

FOREIGN PATENT DOCUMENTS

| | | | | |
|---|---|---|---|---|
| CN | 102906016 A | 1/2013 | | |
| CN | 109903974 A | 6/2019 | | |
| JP | H09-162452 A | 6/1997 | | |
| JP | H10-67503 A | 3/1998 | | |
| JP | 2013-530908 A | 8/2013 | | |
| JP | 7256478 B2 | 4/2023 | | |
| KR | 20020077292 A * | 10/2002 | ............ | H01C 7/04 |
| WO | WO-2019139162 A1 * | 7/2019 | ............ | G01K 7/22 |

OTHER PUBLICATIONS

English translation of KR-20020077292.*

* cited by examiner

*Primary Examiner* — Robert S Walters, Jr.
(74) *Attorney, Agent, or Firm* — Studebaker & Brackett PC

(57) ABSTRACT

A coating process includes adding a body to a reactor; adding a metal alkoxide or precursors thereof to the reactor; adding a catalyst for the hydrolysis of the metal alkoxide to the reactor; and coating the surface of the body with a metal oxide-containing coating layer through the hydrolysis and dehydration condensation of the metal alkoxide. The addition of a body precedes at least one of the addition of a metal alkoxide or precursors thereof and the addition of a catalyst.

15 Claims, 4 Drawing Sheets

COATING PROCESS AND METHOD FOR PRODUCING ELECTRONIC COMPONENT

CROSS-REFERENCE TO RELATED APPLICATION

This application claims benefit of priority to Japanese Patent Application No. 2020-022340, filed Feb. 13, 2020, the entire content of which is incorporated herein by reference.

BACKGROUND

Technical Field

The present disclosure relates to a coating process and a method for producing an electronic component.

Background Art

Japanese Unexamined Patent Application Publication No. 9-162452 describes an electronic component that includes a body, inner electrodes, and outer electrodes. The inner electrodes are inside the body, and the outer electrodes are exposed outside the body and coupled to the inner electrodes. A coating layer covers the surface of the body. The coating layer is formed by a liquid or slurry coating agent applied to the body. The coating agent is prepared by an alkoxide process that involves, for example, aluminum or silicon.

SUMMARY

The coating process of the electronic component described in Japanese Unexamined Patent Application Publication No. 9-162452 is achieved using a coating agent that is a mixture in sol or gel form in which a metal alkoxide has been premixed with a catalyst. The metal alkoxide undergoes reactions, such as hydrolysis and dehydration condensation, between the preparation of the coating agent and its application to the body. As a result, part of the metal alkoxide reacts to a great extent and the rest does not, sometimes causing nonuniform polymerization. Forming a coating layer on a body with a coating agent having such varying degrees of polymerization results in inconsistent quality of the coating layer.

According to preferred embodiments of the present disclosure, a coating process includes adding a body to a reactor; adding a metal alkoxide or precursors thereof to the reactor; adding a catalyst for hydrolysis of the metal alkoxide to the reactor; and coating a surface of the body with a metal oxide-containing coating layer through hydrolysis and dehydration condensation of the metal alkoxide. The addition of a body precedes at least one of the addition of a metal alkoxide or precursors thereof and the addition of a catalyst.

According to other preferred embodiments of the present disclosure, a method for producing an electronic component includes carrying out the above coating process, curing the coating layer, and forming outer electrodes on the body.

In each of these process and method, the catalyzed hydrolysis of the metal alkoxide is initiated with the body inside the reactor. By virtue of this, the hydrolyzed metal alkoxide tends to adhere to the surface of the body before its dehydration condensation proceeds excessively. The body, therefore, is coated with the coating layer before part of the metal alkoxide reacts to a much greater extent than the rest. This helps prevent the quality of the coating layer from varying from part to part.

Accordingly, the present disclosure provides a process and method that produce a coating layer with more consistent quality.

Other features, elements, characteristics and advantages of the present disclosure will become more apparent from the following detailed description of preferred embodiments of the present disclosure with reference to the attached drawings.

DETAILED DESCRIPTION

Figure 1:
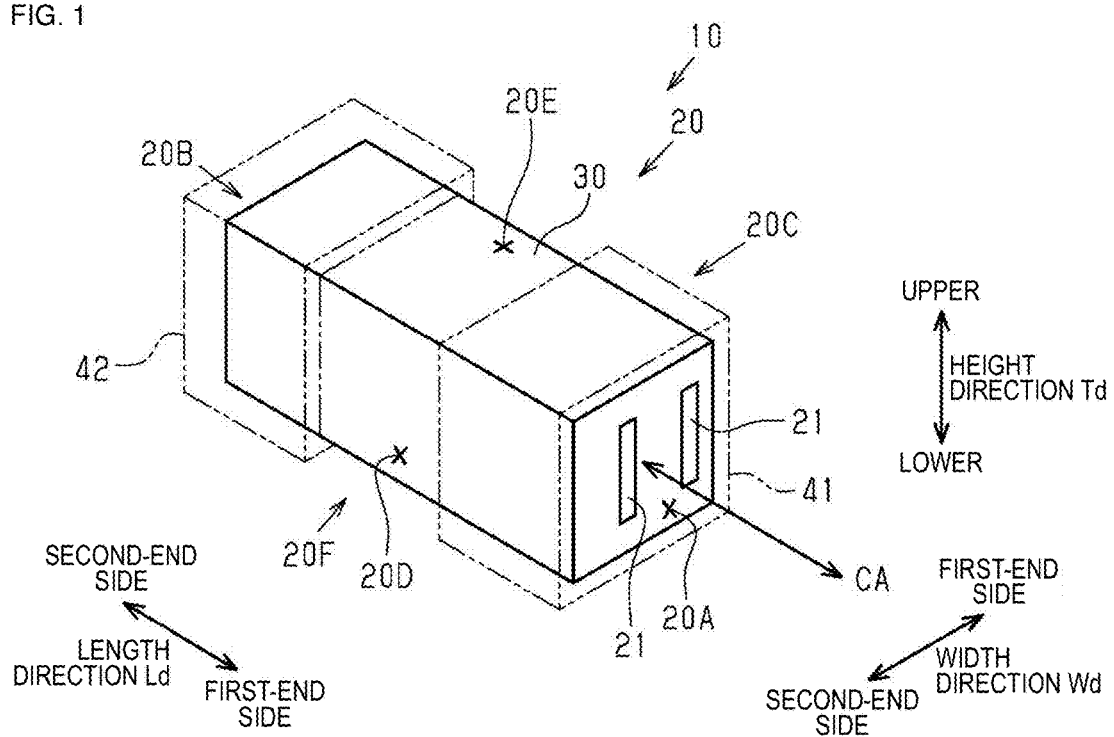
FIG. 1 is a perspective view of an electronic component.

The following describes the coating process and the method for producing an electronic component with reference to drawings. In the drawings, elements may be enlarged for better understanding. The relative dimensions of the elements may be not to scale or may vary from figure to figure.

First, the electronic component is described.

As illustrated in FIG. 1, the electronic component in an exemplary configuration is a surface-mounted negative temperature coefficient (NTC) thermistor 10, for example to be mounted on a circuit board. An NTC thermistor 10 is an electronic component that increases its resistance with increasing temperature. The NTC thermistor 10 includes a body 20.

The body 20 is shaped substantially like a square prism and measures longer along its central axis CA than along each side of the squares. The body 20 is a ceramic article, produced by firing oxides of manganese, nickel, cobalt, etc. In the following, the direction along the central axis CA of the body 20 is referred to as the length direction Ld. The height direction Td and the width direction Wd, both perpendicular to the length direction Ld, are defined as follows: The height direction Td is perpendicular to the length direction Ld and, when the NTC thermistor 10 is on a circuit board, is perpendicular to the primary surface of the circuit board. The width direction Wd is perpendicular to the length direction Ld and, when the NTC thermistor 10 is on a circuit board, is parallel with the primary surface of the circuit board.

The body 20 has six major surfaces: a first end face 20A, a second end face 20B, and four sides. The first end face 20A is on a first-end side in the length direction Ld, and the second end face 20B is on a second-end side, opposite the first-end side, in the length direction Ld. The four sides consist of a first side 20C, a second side 20D, an upper side 20E, and a lower side 20F. The first side 20C is on a first-end side in the width direction Wd, and the second side 20D is on a second-end side, opposite the first-end side, in the width direction Wd. The upper side 20E is at an upper position in the height direction Td, and the lower side 20F is at a lower position in the height direction Td.

Figure 2:
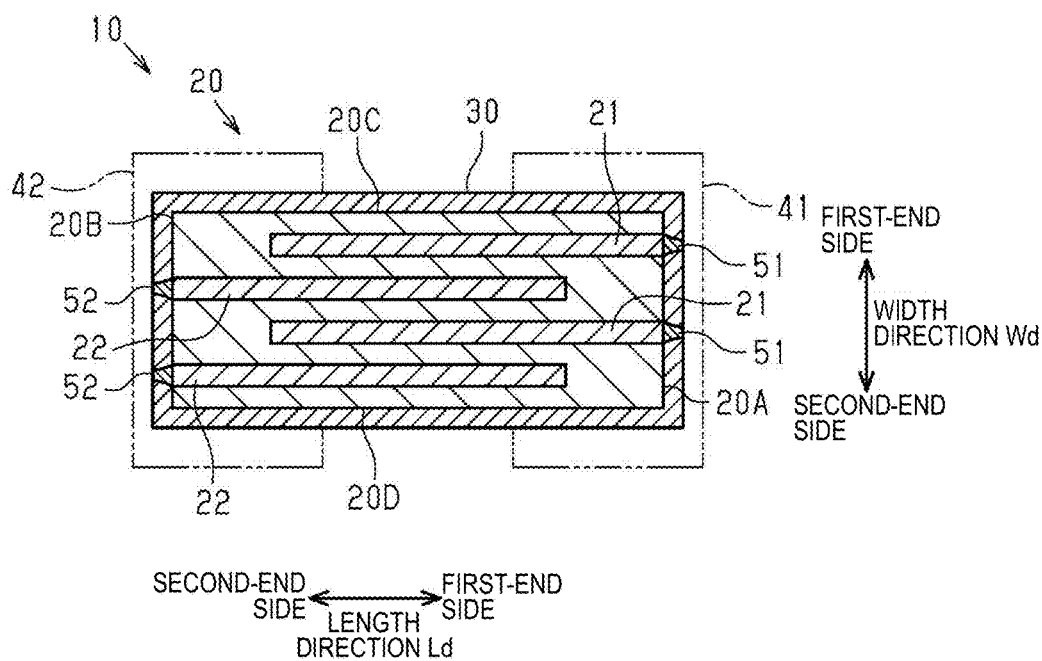
FIG. 2 is a cross-sectional view of an electronic component.

As illustrated in FIG. 2, the body 20 contains two substantially rectangular plate-shaped first inner electrodes 21 and two substantially rectangular second inner electrodes 22. The first and second inner electrodes 21 and 22 are made of silver. The first and second inner electrodes 21 and 22 are positioned with their surfaces at the ends in the direction of thickness substantially parallel with the first and second sides 20C and 20D of the body 20.

The measurement of the first inner electrodes 21 along the length direction Ld, or the longitudinal length of the first inner electrodes 21, is shorter than the length of the body 20 along the length direction Ld. As illustrated in FIG. 1, the measurement of the first inner electrodes 21 along the height direction Td, or the transverse length of the first inner electrodes 21, is approximately ⅔ of the measurement of the body 20 along the height length Td. The second inner electrodes 22 have substantially the same shape as the first inner electrodes 21.

As illustrated in FIG. 2, the first and second inner electrodes 21 and 22 alternate in the width direction Wd. That is, the body 20 contains a first inner electrode 21, a second inner electrode 22, a first inner electrode 21, and a second inner electrode 22 in this order in the width direction Wd, from the first-end side in the with direction Wd. In this embodiment, the inner electrodes 21 and 22 are spaced substantially equally.

All of the two first inner electrodes 21 and two second inner electrodes 22 are in the middle of the body 20 in the height direction Td. The first inner electrodes 21 are aligned to the first-end side in the length direction Ld, whereas the second inner electrodes 22 are aligned to the second-end side in the length direction Ld.

Specifically, the end faces of the first inner electrodes 21 on the first-end side in the length direction Ld are substantially flush with the end face 20A of the body 20 on the first-end side in the length direction Ld and therefore are exposed out of the body 20. The end faces of the first inner electrodes 21 on the second-end side in the length direction Ld are inside the body 20 and therefore are not exposed. Likewise, the end faces of the second inner electrodes 22 on the second-end side in the length direction Ld are substantially flush with the end face 20B of the body 20 on the second-end side in the length direction Ld and therefore are exposed out of the body 20. The end faces of the second inner electrodes 22 on the first-end side in the length direction Ld are inside the body 20 and therefore are not exposed.

As illustrated in FIG. 1, a coating layer 30 covers surface(s) of the body 20. In this embodiment, the coating layer 30 covers all surfaces of the body 20. The coating layer 30 is a layer of a metal oxide. In this embodiment, the coating layer 30 is a silicon-dioxide ceramic layer. The thickness of the coating layer 30 is on the order of tens of nanometers. In FIG. 2, the thickness of the coating layer 30 is exaggerated.

As illustrated in FIG. 1, the NTC thermistor 10 has a first outer electrode 41 over a portion of the body 20 on the first-end side in the length direction Ld. Specifically, the first outer electrode 41 is a "five-surface electrode," covering the first end face 20A of the body 20 and part of the four sides 20C to 20F on the first-end side in the length direction Ld.

In this embodiment, the first outer electrode 41 is on the surface of the coating layer 30. The first outer electrode 41 is made of an alloy of silver and palladium.

The NTC thermistor 10 also has a second outer electrode 42, which is over a portion of the body 20 on the second-end side in the length direction Ld. The second outer electrode 42 is also a five-surface electrode, covering the second end face 20B of the body 20 and part of the four sides 20C to 20F on the second-end side in the length direction Ld. In this embodiment, the second outer electrode 42 is on the surface of the coating layer 30. The second outer electrode 42 is made of the same material as the first outer electrode 41, an alloy of silver and palladium.

On the four sides 20C to 20F, the second outer electrode 42 does not reach but is spaced apart from the first outer electrode 41 along the central axis CA of the body 20. The four sides 20C to 20F of the body 20, moreover, are not covered with the first or second outer electrode 41 or 42 in the middle thereof in the length direction Ld. The coating layer 30 is therefore exposed on the four sides 20C to 20F. In FIGS. 1 and 2, the first and second outer electrodes 41 and 42 are indicated by long-dash double-short-dash lines.

As illustrated in FIG. 2, the first outer electrode 41 and the end faces of the first inner electrodes 21 on the first-end side in the length direction Ld are coupled together by first through structures 51, which are portions of the first inner electrodes 21 extending through the coating layer 30. As detailed later herein, the first through structures 51 are formed when the silver as the material for the first inner electrodes 21 extends toward the first outer electrode 41 during the production of the NTC thermistor 10. Likewise, the second outer electrode 42 and the end faces of the second inner electrode 22 on the second-end side in the length direction Ld are coupled together by second through structures 52, which are portions of the second inner electrodes 22 extending through the coating layer 30. Like the first through structures 51, the second through structures 52 are formed when the silver as the material for the second inner electrodes 22 extends toward the second outer electrode 42 during the production of the NTC thermistor 10. Although the first inner electrodes 21 and the first through structures 51 in FIG. 2 are illustrated as if they are separate elements having a boundary therebetween, there is no clear boundary between them. The same is true for the second through structures 52, too. In FIG. 1, the first through structures 51 are not illustrated.

The following describes how to produce the NTC thermistor 10.

Figure 3:
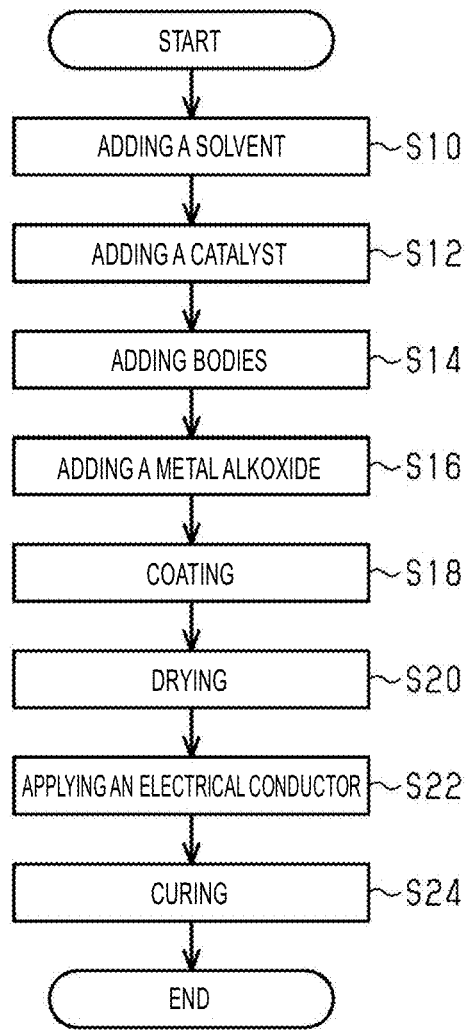
FIG. 3 is a graphical representation of a method for producing electronic components.

As illustrated in FIG. 3, a method for producing NTC thermistors 10 includes adding a solvent (S10), adding a catalyst (S12), adding bodies (S14), adding a metal alkoxide (S16), coating (S18), drying (S20), applying an electrical conductor (S22), and curing (S24).

Before starting the process of coating with a coating layer 30, bodies 20 are prepared. Specifically, each body 20 is prepared by stacking ceramic layers with first and second inner electrodes 21 and 22 interposed therebetween. The first and second inner electrodes 21 and 22 are positioned so that part of their ends will be exposed on the surface of the resulting body 20. This determines the position of the first and second inner electrodes 21 and 22 inside the resulting body 20. The ceramic layers and first and second inner electrodes 21 and 22 are then pressure-bonded to form an unfired ceramic multilayer structure. Firing this ceramic multilayer structure gives a body 20. Bodies 20 prepared in this way are coated with a coating layer 30.

Figure 4:
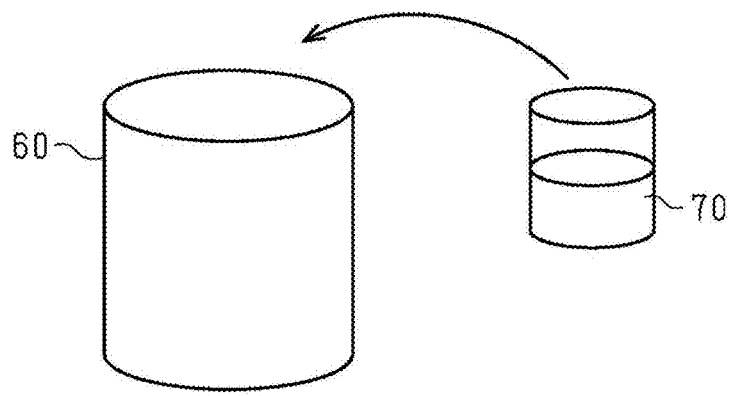
FIG. 4 is a graphical representation of adding a solvent.

The process of coating with a coating layer 30 starts with adding a solvent (S10). As illustrated in FIG. 4, 2-propanol as a solvent 70 is put into a reactor 60.

Figure 5:
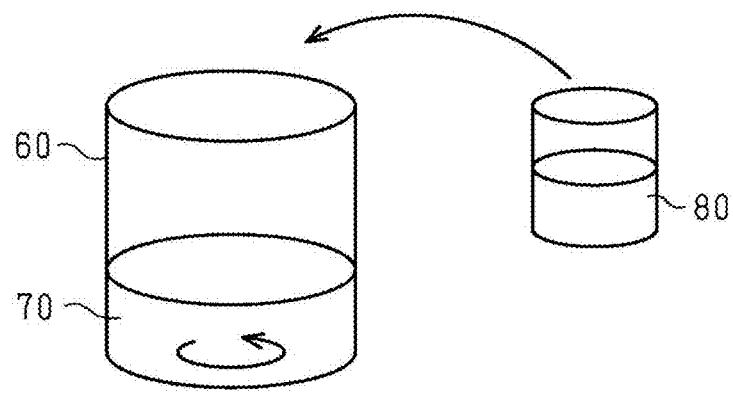
FIG. 5 is a graphical representation of adding a catalyst.

As illustrated in FIG. 3, the addition of a solvent (S10) is followed by adding a catalyst (S12). As illustrated in FIG. 5, the solvent 70 in the reactor 60 starts to be stirred. Then aqueous ammonia as a catalyst-containing aqueous solution 80 is put into the reactor 60. In this embodiment, the catalyst is hydroxide ions and serves as a catalyst for the hydrolysis of a metal alkoxide 90 (described later herein).

Figure 6:
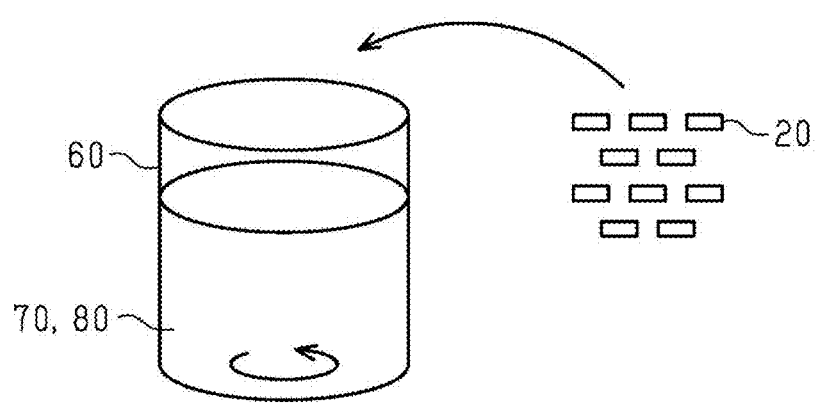
FIG. 6 is a graphical representation of adding bodies.

As illustrated in FIG. 3, the addition of a catalyst (S12) is followed by adding bodies (S14). As illustrated in FIG. 6, multiple bodies 20 prepared beforehand as described above are put into the reactor 60.

Figure 7:
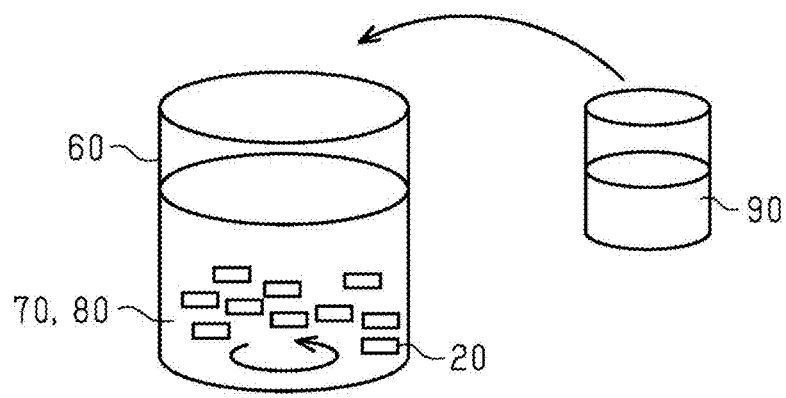
FIG. 7 is a graphical representation of adding a metal alkoxide.

As illustrated in FIG. 3, the addition of bodies (S14) is followed by adding a metal alkoxide (S16). As illustrated in FIG. 7, liquid tetraethyl orthosilicate as a metal alkoxide 90 is put into the reactor 60. Tetraethyl orthosilicate is also referred to as tetraethoxysilane. In this embodiment, the amount of metal alkoxide 90 added is calculated from the surface area of the bodies 20 added, specifically by multiplying the amount of metal alkoxide 90 required per body 20 for coating with the coating layer 30 by the number of bodies 20 added.

As illustrated in FIG. 3, the addition of a metal alkoxide (S16) is followed by coating (S18). Specifically, the stirring of the solvent 70, started when adding the catalyst (S12), is continued for a predetermined period of time after the addition of the metal alkoxide 90 to the reactor 60 (S16). This causes the metal alkoxide 90 to be hydrolyzed by the action of the catalyst hydroxide ions. While the metal alkoxide 90 is being hydrolyzed, hydrolyzed metal alkoxide 90 adheres to the surface of the bodies 20. Molecules of the metal alkoxide 90 that have adhered to the surface of the bodies 20 condense by dehydration, forming a coating layer 30. The coating layer 30 covers the entire surface of the bodies 20 because the bodies 20 are completely in the solution. At this point of the process, the coating layer 30 is in sol form. In this embodiment, the addition of a solvent (S10), the addition of a catalyst (S12), the addition of bodies (S14), the addition of a metal alkoxide (S16), and coating (S18) constitute a process of coating bodies 20 with a coating layer 30.

The coating (S18) is followed by drying (S20). The bodies 20 are removed from the reactor 60 and dried after a predetermined time of continued stirring during the coating (S18). The coating layer 30 in sol form is dried, forming a coating layer 30 in gel form.

Figure 8:
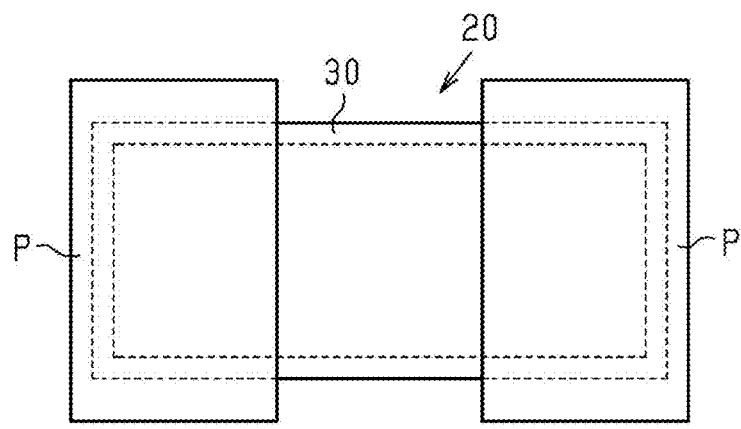
FIG. 8 is a graphical representation of applying an electrical conductor.

The drying (S20) is followed by applying an electrical conductor (S22). As illustrated in FIG. 8, an electrically conductive paste P is applied to two portions of the surface of the coating layer 30, one on the first-end side and the other on the second-end side in the length direction Ld. Specifically, the electrically conductive paste P is applied to cover the coating layer 30 on the entire first end face 20A and on part of the four sides 20C to 20F and also to cover the coating layer 30 on the entire second end face 20B and on part of the four sides 20C to 20F.

As illustrated in FIG. 3, the application of an electrical conductor (S22) is followed by curing (S24). In this embodiment, the curing (S24) is by heating. The bodies 20 are heated with the coating layer 30 and applied electrically conductive paste P thereon. This causes the water in the coating layer 30 in gel form evaporates, thereby drying up and hardening the coating layer 30 to make it cover the surface of the bodies 20 as illustrated in FIG. 1. At the same time, first and second outer electrodes 41 and 42 are formed.

The application of an electrical conductor (S22) and curing (S24) therefore constitute the formation of outer electrodes. In this embodiment, therefore, the curing (S24) is not only to cure the coating layer 30 but also is part of the formation of outer electrodes.

In this embodiment, the Kirkendall effect occurs between the first inner electrodes 21 and the first outer electrode 41 while the bodies 20 are heated during the curing (S24), because of the difference in the rate of diffusion of atoms between these electrodes. The silver contained in the first inner electrodes 21 is attracted toward the first outer electrode 41, which contains palladium. As a result, first through structures 51 grow from the first inner electrodes 21 to reach the first outer electrode 41 through the coating layer 30, thereby coupling the first inner electrodes 21 and the first outer electrode 41 together. The same occurs to the second inner electrodes 22 and the second outer electrode 42. Second through structures 52 grow and couple them together in the same way.

NTC thermistors 10 produced as described above were tested for inconsistency in the quality of the coating layer against NTC thermistors of a comparative example. The inconsistency in the quality of the coating layer was based on nonuniformity in the thickness of the coating layer. The NTC thermistors of the Comparative Example, one illustrated in FIG. 9, were produced by mixing a catalyst-containing aqueous solution 80 with a metal alkoxide 90 first, then applying the resulting coating liquid to the surface of bodies 20, and then carrying out drying (S20), the application of an electrical conductor (S22), and curing (S24) in the same way as in the above embodiment.

Figure 9:
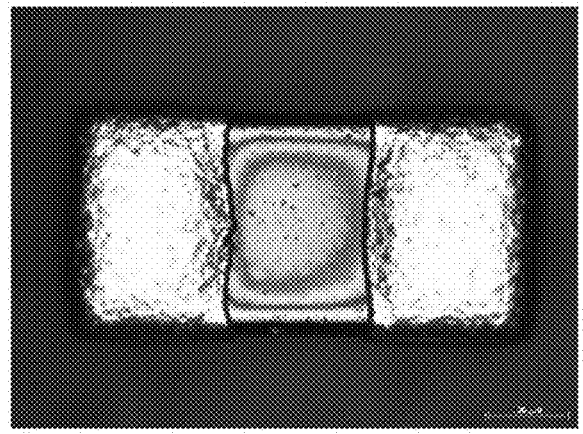
FIG. 9 is a side-view image of an electronic component according to the Comparative Example.

The NTC thermistors of the Comparative Example were observed under a microscope with the thermistors illuminated with light. As shown in FIG. 9, interference fringes appeared on the surface of the coating layer 30. A coating layer 30 having a thickness on the order of tens of nanometers presents interference fringes if its thickness is nonuniform. The interference fringes seen on the surface of the coating layer 30 therefore indicate that the coating layer 30 of the NTC thermistors of the Comparative Example had nonuniform thickness.

Figure 10:
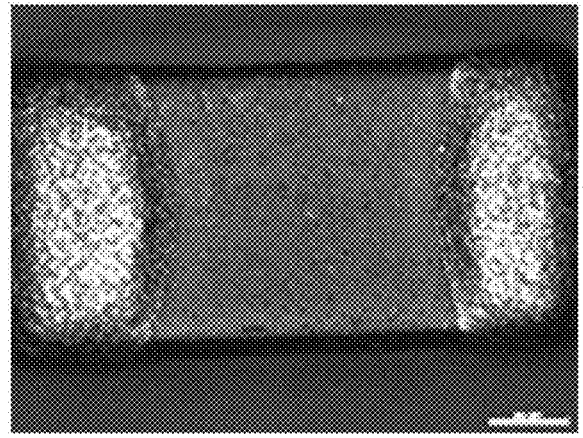
FIG. 10 is a side-view image of an electronic component according to the Example.

The NTC thermistors 10 produced as in the above embodiment were also observed under a microscope with the thermistors illuminated with light. As shown in FIG. 10, no interference fringes appeared on the surface of the coating layer 30. This indicates that the coating layer 30 of the NTC thermistors 10 according to this embodiment had uniform thickness, or its thickness varied little from part to part, compared with that of the NTC thermistors of the Comparative Example.

The following describes operations and advantages of the above embodiment.

(1) In the above embodiment, the catalyzed hydrolysis of the metal alkoxide 90 added (S16) is initiated with the bodies 20 inside the reactor 60. By virtue of this, the hydrolyzed metal alkoxide 90 tends to adhere to the surface of the bodies 20 before its dehydration condensation proceeds excessively. The bodies 20, therefore, are coated with the coating layer 30 before part of the metal alkoxide 90 reacts to a much greater extent than the rest. This helps prevent the quality of the coating layer 30 from varying from part to part, thereby helping prevent the thickness of the coating layer 30 from being nonuniform.

(2) In the above embodiment, the addition of a solvent (S10) precedes the addition of a catalyst (S12) and the addition of a metal alkoxide (S16). When the metal alkoxide 90 mixes with a catalyst-containing aqueous solution 80, therefore, there is already a solvent 70 inside the reactor 60. By virtue of this, the hydrolyzed metal alkoxide 90 tends to adhere to the surface of the bodies 20 evenly.

(3) In the above embodiment, the stirring of the contents of the reactor 60 is started after the addition of a solvent (S10) and is continued even during the coating (S18). The metal alkoxide 90 and the catalyst-containing aqueous solution 80 are therefore mixed to homogeneity. The hydrolyzed metal alkoxide 90 undergoes dehydration condensation at an equal rate, and therefore tends to be polymerized to an equal degree, in every part of it.

(4) In the above embodiment, the reactor 60 contains a solvent 70, and this solvent 70 is stirred to ensure that the metal alkoxide 90 undergoes dehydration condensation at substantially equal rates in every part of it. In the above embodiment, furthermore, multiple bodies 20 are put into the reactor 60. By virtue of this, the thickness of the coating layer 30 is not only uniform within each body 20 but also is consistent between multiple bodies 20.

(5) If the catalyst-containing aqueous solution 80 were put into the reactor 60 with the metal alkoxide 90 inside the container 60, the reaction of the metal alkoxide 90 might be localized to where the catalyst concentration is high at the addition of the aqueous solution 80. In the above embodiment, the addition of a catalyst (S12) precedes the addition of a metal alkoxide (S16). When the metal alkoxide 90 is put into the reactor 60 (S16), therefore, there is already a catalyst-containing aqueous solution 80 inside the reactor 60. By virtue of this, the localization of the reaction of the metal alkoxide 90 is milder than if the catalyst-containing aqueous solution 80 is added with the metal alkoxide 90 inside the reactor 60.

(6) In the above embodiment, the metal alkoxide 90 is tetraethyl orthosilicate. Reactions of a metal alkoxide 90 containing silicon are relatively slow and therefore are easy to control to proceed at a constant rate.

(7) In the above embodiment, the addition of a metal alkoxide (S16) is after the addition of bodies (S14). The manufacturer can therefore add bodies 20 first (S14) and then calculate how much metal alkoxide 90 is needed to form the coating layer 30 on the bodies 20, for example the amount of metal alkoxide 90 that gives a coating layer 30 of the desired thickness based on the surface area of the bodies 20 added, before adding the metal alkoxide (S16). Excessive consumption of the metal alkoxide 90 can therefore be avoided.

The above embodiment can be modified as follows. The above embodiment and the following variations can be combined unless technically incompatible.

In the above embodiment, the electronic component to which the coating process is applied as part of its production does not need to be an NTC thermistor 10. It may be, for example, a non-NTC thermistor or may be a multilayer capacitor or inductor. The coating process according to the above embodiment can be used in the production of any electronic component that includes at least a body 20 and a coating layer 30 covering the surface of the body 20.

In the above embodiment, the material for the bodies 20 does not need to be as specified in the embodiment. For example, the bodies 20 may be made of manganese-zinc ferrite or copper-zinc ferrite. Alternatively, the bodies 20 may be resin articles.

In the above embodiment, the shape of the bodies 20 does not need to be as specified in the embodiment. The bodies 20 may be shaped substantially like columns or polygonal prisms. Alternatively, the bodies 20 may be cores of wire-wound inductors. Each of the cores is formed by, for example, a spindle and flanges at the ends of the spindle, and the shape of the cores may be what is called the drum-core shape. Wire-wound inductors can be produced by making the cores by carrying out the above coating process to curing (S24), which gives bodies 20 with the coating layer 30 and the first and second outer electrodes 41 and 42 thereon, and then winding an electrically conductive wire around the cores.

In the above embodiment, the thickness of the coating layer 30 does not need to be on the order of tens of nanometers but may be on the order of tens of micrometers. A coating layer 30 having a thickness on the order of tens of nanometers, however, is easier to test for its thickness nonuniformity by observing interference fringes under illumination with light. The coating layer 30 can be made thicker simply by, for example, repeating the addition of a metal alkoxide (S16) and coating (S18).

In the above embodiment, the first and second inner electrodes 21 and 22 can be in any shape as long as they are in electrical communication with the first and second outer electrodes 41 and 42, respectively. The number of first inner electrodes 21 and that of second inner electrodes 22 are not critical either. There may be one first inner electrode 21 or three or more first inner electrodes 21.

In the above embodiment, the combination of materials for the first inner electrodes 21 and the first outer electrode 41 does not need to be as specified in the embodiment. Any combination in which one contains silver and the other contains palladium provides the Kirkendall effect. The same is true for the combination of materials for the second inner electrodes 22 and the second outer electrode 42, too.

The combination of materials for the first inner electrodes 21 and the first outer electrode 41, furthermore, does not need to be silver and palladium. That is, the Kirkendall effect is not essential. If a different combination is used, the first inner electrodes 21 are exposed after the coating (S18), for example by physically removing part of the coating layer 30 by grinding the first end face 20A of the bodies 20. Then the drying (S20) and the application of an electrical conductor (S22) are carried out. This means the electrically conductive paste P is applied directly to the first inner electrodes 21, and the coupling between the first inner electrodes 21 and the first outer electrode 41 is achieved as a result of this. The same is true for the combination of materials for the second inner electrodes 22 and the second outer electrode 42, too.

In the above embodiment, the position of the first outer electrode 41 does not need to be as specified in the embodiment. For example, the first outer electrode 41 may be limited to the lower side 20F, which later serves as the mounting surface, of the bodies 20 or may extend from the lower side 20F to the first end face 20A of the bodies 20. The same is true for the second outer electrode 42, too.

In the above embodiment, the formation of outer electrodes does not need to be as specified in the embodiment. For example, the first and second outer electrodes 41 and 42 may be formed by curing the coating layer 30 by heating after the coating (S18) and then carrying out the application of an electrical conductor (S22) and curing (S24). Alternatively, for example, the first outer electrode 41 may be formed by exposing part of the first inner electrodes 21 on the bodies 20 as in one of the foregoing variations and plating the exposed portion.

In the above embodiment, the curing (S24) does not need to be simultaneous curing of the coating layer 30 and an electrically conductive paste P. For example, if the electrically conductive paste P is made from an ultraviolet-curable material, the coating layer 30 may be cured by heating, and then the electrically conductive paste P may be cured by ultraviolet irradiation.

In the above embodiment, the coating layer 30 may be cured by vaporizing water to a sufficient degree of dryness during the drying (S20). When this is the case, the curing (S24) of the coating layer 30 is part of the drying (S20).

In the above embodiment, the addition of bodies (S14) may precede the addition of a catalyst (S12). If the addition of bodies (S14) precedes the addition of a catalyst (S12), the addition of a metal alkoxide (S16) may precede the addition of a catalyst (S12) and/or the addition of bodies (S14). The addition of bodies (S14) only needs to precede at least one of the addition of a metal alkoxide (S16) and the addition of a catalyst (S12).

In the above embodiment, the solvent 70 added (S10) does not need to be that specified in the embodiment. Any liquid can be used in which the metal alkoxide 90 disperses adequately.

In the above embodiment, the addition of a solvent (S10) may be after the addition of a catalyst (S12) and/or the addition of bodies (S14). The addition of a solvent (S10) only needs to precede at least one of the addition of a metal alkoxide (S16) and the addition of a catalyst (S12). The addition of a solvent (S10) may even be omitted. If no solvent is used, using a sufficiently water-rich catalyst-containing aqueous solution 80 ensures that the metal alkoxide 90 reacts in a liquid phase. Alternatively, a mixture of the catalyst-containing aqueous solution 80 and an organic solvent as the solvent 70 may be added.

In the above embodiment, the stirring of the contents of the reactor 60 is started when adding a catalyst (S12). Stirring the contents of the reactor 60 at least during the coating (S18), however, is enough to keep the rate of reaction of the metal alkoxide 90 constant easily. The stirring of the contents of the reactor 60 may be achieved by rotating a stirring blade or may be achieved by inversion, for example by turning over the reactor 60. The stirring of the contents of the reactor 60 may even be omitted. For example, setting the percentage of the metal alkoxide 90 to the solvent 70 small enough can ensure that the metal alkoxide 90 disperses sufficiently and reacts accordingly slowly.

In the above embodiment, the catalyst-containing aqueous solution 80 is aqueous ammonia, and the catalyst is hydroxide ions. This, however, is not the only possible choice for the catalyst. Any basic aqueous solution catalyzes the hydrolysis of a metal alkoxide 90 as aqueous ammonia does in the above embodiment. Acidic aqueous solutions also catalyze the hydrolysis of a metal alkoxide 90. Even a neutral aqueous solution works if it contains ions, for example, that catalyze the hydrolysis.

The above embodiment includes a statement saying the catalyst is added in the form of an aqueous solution 80 containing it. The catalyst, however, may be put into the reactor 60 in the form of a solid compound containing it, and water may be added separately. In this case, the formation of the catalyst inside the reactor 60 can be deemed as the addition of the catalyst to the reactor 60. Alternatively, for example, atmospheric water may be used to cause the hydrolysis after the addition of a solid compound containing the catalyst to the reactor 60.

In the above embodiment, the metal alkoxide 90 does not need to be tetraethyl orthosilicate. For example, the metal in the metal alkoxide 90 can be titanium, zirconium, aluminum, etc. Reactions of a metal alkoxide 90 containing silicon, however, are slow, and therefore are easy to control to proceed at a constant rate, compared with those of metal alkoxides containing other metals. The alkoxy group, furthermore, of the metal alkoxide 90 may be a methoxy, propoxy, or other group and may even be modified with a long-chain alkyl, epoxy, or other functional group as in a coupling agent. The number of ligands bound to the metal in the metal alkoxide 90 does not need to be four, but may be three or two.

In the above embodiment, the metal alkoxide 90 added (S16) may be replaced with a solution containing precursors to produce the metal alkoxide 90. That is, the metal alkoxide 90 does not need to be produced outside the reactor 60 before addition to the reactor 60 but may be formed inside the reactor 60. For example, a metal alkoxide 90 is formed when a metal salt reacts with an alcohol. Putting a metal salt and an alcohol as metal alkoxide precursors into the reactor 60 and allowing them to react together therefore gives a metal alkoxide 90. This formation of a metal alkoxide 90 can also be deemed as the addition of a metal alkoxide 90 to the reactor 60.

In the above embodiment, the coating process is applied to bodies 20 of electronic components. The bodies coated, however, do not need to be a component of electronic components. For example, the bodies may be substrates.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A process of producing an electronic component comprising:
   adding a body to a reactor, wherein the body includes a ceramic multilayer structure;
   adding a metal alkoxide or precursors thereof to the reactor;
   adding a catalyst for hydrolysis of the metal alkoxide to the reactor;
   coating a surface of the body with a coating layer including a metal oxide through hydrolysis and dehydration condensation of the metal alkoxide;
   curing the coating layer; and
   forming outer electrodes on a surface of the coating layer at end portions of the ceramic multilayer structure with the coating layer being exposed between the outer electrodes;
   wherein the adding of the body to the reactor precedes at least one of the adding of the metal alkoxide or precursors thereof to the reactor and the adding of the catalyst to the reactor.

2. The process according to claim 1, further comprising:
   adding a solvent to the reactor, the adding of the solvent preceding at least one of the adding of the metal alkoxide or precursors thereof to the reactor and the adding of the catalyst to the reactor.

3. The process according to claim 2, wherein
   contents of the reactor are stirred in the coating of the surface of the body.

4. The process according to claim 3, wherein
   the adding of the catalyst to the reactor precedes the adding of the metal alkoxide or precursors thereof to the reactor.

5. The process according to claim 3, wherein
   the metal alkoxide includes tetraethyl orthosilicate.

6. The process according to claim 2, wherein the adding of the catalyst to the reactor precedes the adding of the metal alkoxide or precursors thereof to the reactor.

7. The process according to claim 6, wherein the metal alkoxide includes tetraethyl orthosilicate.

8. The process according to claim 2, wherein the metal alkoxide includes tetraethyl orthosilicate.

9. The process according to claim 1, wherein contents of the reactor are stirred in the coating of the surface of the body.

10. The process according to claim 9, wherein the adding of the catalyst to the reactor precedes the adding of the metal alkoxide or precursors thereof to the reactor.

11. The process according to claim 9, wherein the metal alkoxide includes tetraethyl orthosilicate.

12. The process according to claim 1, wherein the adding of the catalyst to the reactor precedes the adding of the metal alkoxide or precursors thereof to the reactor.

13. The process according to claim 12, wherein the metal alkoxide includes tetraethyl orthosilicate.

14. The process according to claim 1, wherein the metal alkoxide includes tetraethyl orthosilicate.

15. A process of producing an electronic component comprising:

adding a body to a reactor, wherein the body includes a ceramic multilayer structure;

adding a metal alkoxide or precursors thereof to the reactor;

adding a catalyst for hydrolysis of the metal alkoxide to the reactor;

coating a surface of the body with a coating layer including a metal oxide through hydrolysis and dehydration condensation of the metal alkoxide;

forming an electrically conductive paste to a first portion and a second portion of a surface of the coating layer, the first portion on a first end side of the ceramic multilayer structure and the second portion on a second end side of the ceramic multilayer structure in a length direction; and curing the coating layer, wherein the curing forms outer electrodes from the electrically conductive paste at the first end side and the second end side of the ceramic multilayer structure with the coating layer being exposed between the outer electrodes, wherein the adding of the body to the reactor precedes at least one of the adding of the metal alkoxide or precursors thereof to the reactor and the adding of the catalyst to the reactor.

* * * * *